R. B. HEWITT.
DIFFERENTIAL DRIVING GEAR.
APPLICATION FILED FEB. 7, 1916.
1,211,151.
Patented Jan. 2, 1917.
2 SHEETS—SHEET 1.
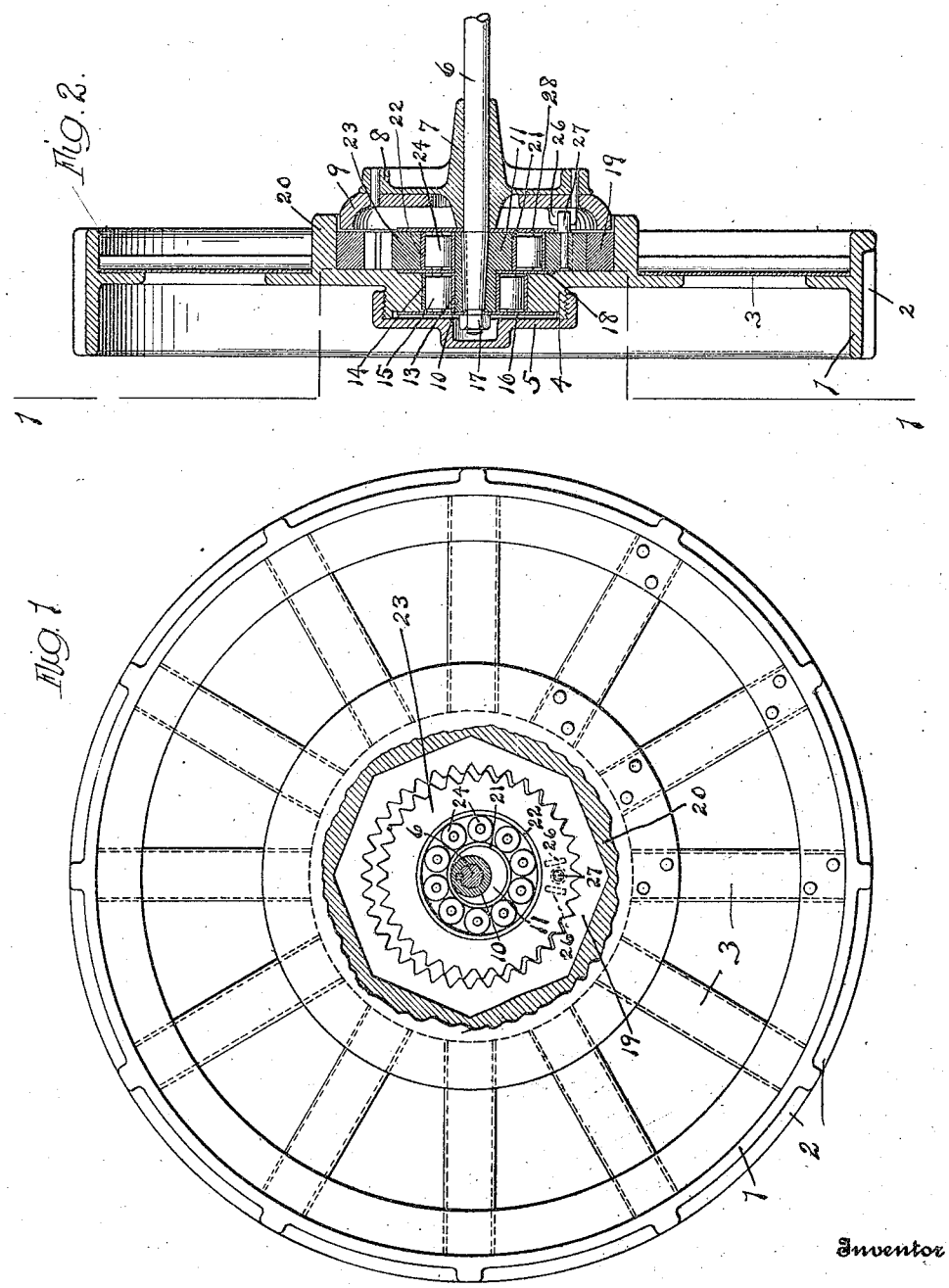
Witness
E. R. Barrett
Inventor
Richard B. Hewitt.
By Pagelsen and Spencer
Attorneys

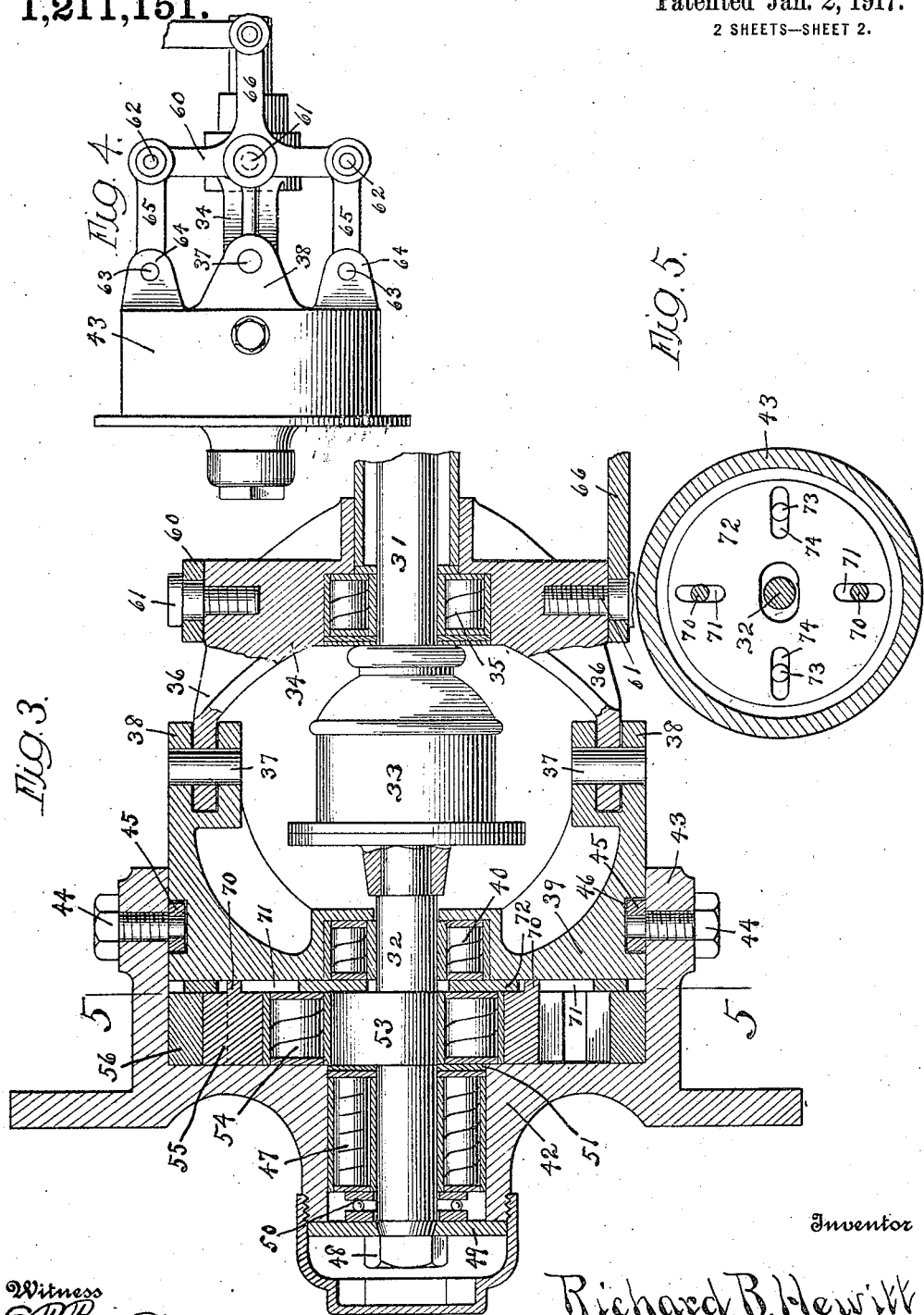
R. B. HEWITT.
DIFFERENTIAL DRIVING GEAR.
APPLICATION FILED FEB. 7, 1916.
1,211,151.
Patented Jan. 2, 1917.
2 SHEETS—SHEET 2.

UNITED STATES PATENT OFFICE.

RICHARD B. HEWITT, OF BIRMINGHAM, MICHIGAN.

DIFFERENTIAL DRIVING-GEAR.

1,211,151. Specification of Letters Patent. Patented Jan. 2, 1917.

Application filed February 7, 1916. Serial No. 76,849.

*To all whom it may concern:*

Be it known that I, RICHARD B. HEWITT, a citizen of the United States, and residing at Birmingham, in the county of Oakland and State of Michigan, have invented a new and Improved Differential Driving-Gear, of which the following is a specification.

This invention relates to driving wheels for motor vehicles, and especially to wheels adapted for heavy trucks, and its object is to provide a driving wheel which shall be strong, easily substituted for wheels already in position, and which can be employed to change ordinary high speed vehicles to slow speed tractors.

This invention consists in mounting differential gearing within the hubs of the driving or tractor wheels of motor vehicles, said gearing each consisting of an eccentric secured to the adjacent end of the revolving axle, a pinion revolubly mounted on the eccentric, means to prevent this gear from rotating, and a gear ring surrounding the pinion and secured to the hub of a tractor wheel that is revoluble on said axle, the gear ring having internal teeth whose number is greater than the number of external teeth on the pinion.

This invention further consists in forming the axle with a universal joint to permit the wheel to be swung through a horizontal arc, and to so construct the axle casing and the support for the stub-end of the axle that the wheel cannot swing through a vertical arc.

In the accompanying drawings, Figure 1 is an elevation of a tractor wheel having a portion of its hub broken away to show the differential gear. Fig. 2 is a longitudinal central section of this wheel. Fig. 3 is a longitudinal central vertical section of a tractor wheel hub adapted to be used as a steering wheel. Fig. 4 is a bottom plan thereof on a smaller scale. Fig. 5 is an elevation of a controlling plate for the driving pinion.

Similar reference characters refer to like parts throughout the several views.

The wheel shown in Figs. 1 and 2 consists of a rim 1 having diagonal ribs 2, channel iron spokes 3 and a hub 4, onto which the hub-cap 5 is screwed. An axle 6 extends into this hub and is journaled in the bearing 7 having a flange 8, to which the cup-shaped plate 9 is secured. These parts may be of any other desired form and in themselves form no part of the present invention.

The end of the axle is preferably tapered and receives the hub 10 of the eccentric 11. A bearing ring 13 is preferably mounted on this hub 10 and another bearing ring 14 is mounted in the hub 4 of the wheel, and between these bearing rings are the bearing rollers 15. A disk 16 and nut 17 on the end of the axle limit the outward movement of the wheel and of the bearing rollers 15. The inward movement of these bearing rollers is limited by the plate 18.

The hub 4 is formed with an annular flange 20 in which the internally toothed gear ring 19 is fitted, the circumference of this ring preferably being polygonal. A bearing ring 21 is mounted on the eccentric 11 and a second bearing ring 22 is mounted within the pinion 23. Bearing rollers 24 are positioned between these bearing rings.

The diameter and eccentricity of the eccentric 11 are such that some of the teeth of the pinion 23 will always engage some of the teeth of the gear ring 19. Any desired means may be employed to prevent the pinion from rotating with the eccentric 11, that shown being a pair of short lugs 26 on the outer face of the member 9 of the axle bearing, between which lugs the pin 27 on the pinion extends. The pinion can therefore be carried around by the eccentric but cannot turn with it or with the axle.

The action of the differential gearing is such that the tractor wheel will be turned only a fraction of a revolution at each revolution of the axle, that fraction being represented by $$\frac{a}{a-b},$$

where $a$ equals the number of teeth in the gear ring 19 and $b$ equals the number of teeth in this pinion 23. The reduction in number of revolutions and the increase in tractive pull will be in constant proportion although the ultimate limit will probably never be necessary or even desirable. The plate 28 limits the inward movement of the bearing rollers 24.

The axle and the part 7 shown in Figs. 1 and 2 are of well known automobile construction and these figures clearly indicate that this tractor wheel can be substituted for the rear driving wheels of ordinary automobiles without any change in the construction of such vehicles.

Figs. 3, 4 and 5 illustrate the hub of a tractor wheel, provided with the same type of differential driving mechanism, mounted on a stub-axle that can be swung, while at the same time it transmits force to the differential gears. The axle 31 connects to a stub-axle 32 by means of a universal coupling 33 of any desired construction. A frame 34 is a rigid portion of the vehicle frame or chassis, and is provided with a roller bearing 35 of any desired type for the axle 31. This frame 34 also comprises arms 36 that carry pins 37 in vertical alinement with each other and with the universal coupling 33, which pins extend through the ears 38 that project from the head 39. This head is provided with a roller bearing 40 which supports the stub axle 32 which can therefore swing about the vertical axis of these pins 37 and be still revolved by means of the coupling 33.

The hub 42 of the tractor wheel has a cylindrical flange 43 that extends around the head 39 and carries pins 44 which have rollers 45 on their inner ends, which rollers run freely in the groove 46 in the head 39 and thus position the hub 42 longitudinally of the stub-axle. A roller bearing 47 between the stub-axle and hub 42 prevents excessive friction. A nut 48 and a disk 49 on the end of the stub-shaft press against the thrust bearing 50 which engages the roller bearing 47, which, in turn, engages a thrust collar or ring 51. These thrust collars and bearings may be of any desired material and design.

On the stub-axle 32 is an eccentric 53 which is within a roller bearing 54, and this bearing, in turn, is within the pinion 55 which has external teeth that engage the internal teeth of the gear ring 56 that is secured to the hub 42. The operation of the stub-axle 32, the eccentric 53, pinion 55, and gear ring 56 is the same as that of the axle 6, eccentric 11, pinion 23 and gear ring 19 before described.

In order to swing the wheel and stub-shaft 32 through a horizontal arc on the pins 37, I prefer to mount a yoke 60 on the pins 61 carried by the frame 34. The pins 62 carried by this yoke connect to the pins 63 carried by the ears 64 on the head 39 by means of links 65. A lever 66 on this yoke may connect to any desired steering mechanism by means of which the tractor wheels may be swung.

In Figs. 1 and 2, the pinion 23 is shown provided with a pin 27 that extends between the stationary lugs 26. In the device shown in Figs. 3, 4 and 5, the pinion 55 has pins 70 that extend into the slots 71 in the plate 72, shown in Fig. 5, and this plate is permitted lateral movement and is prevented from moving up and down by the pins 73 that are mounted on the head 39 and extend into the slots 74. This plate will permit the pinion to move up and down and will move back and forth horizontally with the pinion. As the eccentric 53 turns with the axle, the pinion will be carried around by it in a circular path with its teeth in constant engagement with those of the gear-ring, but this plate will prevent the pinion from revolving on its own axis and thus compel the gear-ring to revolve.

Many changes in the details and proportions of this driving gear can be made by those skilled in designing driving mechanism for vehicles without departing from the spirit of my invention.

I claim:

1. In a driving mechanism for motor vehicles, the combination of a revoluble axle, a tractor wheel revoluble on said axle, and differential gearing mounted in said tractor wheel and connected to both the wheel and axle and comprising an internally toothed gear ring mounted in the wheel, an eccentric on the axle, a pinion mounted on the eccentric and meshing with said gear ring, and means for preventing the pinion from revolving on its own axis.

2. In a driving mechanism for motor vehicles, the combination of a revoluble axle, a tractor wheel revoluble on said axle, an internally toothed gear ring mounted in the wheel, an eccentric on the axle, a pinion mounted on the eccentric and meshing with said gear ring, and means for preventing the pinion from revolving on its own axis.

3. In a driving mechanism for motor vehicles, the combination of a revoluble axle, a tractor wheel-hub revoluble thereon, and gearing mounted on said axle and connected to said wheel-hub for driving the wheel-hub at less speed than the speed of the axle and comprising an internally toothed gear ring mounted in the wheel, an eccentric on the axle, a pinion mounted on the eccentric and meshing with said gear ring, and means for preventing the pinion from revolving on its own axis.

4. In a driving mechanism for motor vehicles, the combination of a revoluble main axle and a stub-axle, means to support the main axle, a coupling connecting the stub-axle to the main axle, a support for the stub-axle pivoted to the support for the main axle, a wheel-hub revoluble on the stub-axle and on the support for the stub-axle, and gearing mounted on said stub-axle and connected to said wheel-hub for driving the wheel-hub at less speed than the speed of the axle.

5. In a driving mechanism for motor vehicles, the combination of a revoluble main axle and a stub-axle, means to support the main axle, a coupling connecting the stub-axle to the main axle, a support for the stub-axle pivoted to the support for the main axle, a wheel hub revoluble on the stub-axle and on the support for the stub-axle, gearing mounted on said stub-axle and connected to said wheel hub for driving the wheel hub at less speed than the speed of the axle, and means to swing the wheel hub, the stub-axle and the support for the stub-axle through a horizontal arc.

6. In a driving mechanism for motor vehicles, the combination of a revoluble main axle, a stub-axle, a universal coupling between said axles, a support for the stub-axle, a frame to carry said support, vertical pivots connecting the frame to the support, a wheel-hub revoluble on the stub-axle, gearing connecting the stub-shaft and the wheel-hub through which the hub and shaft will be caused to revolve at different speeds and comprising an internally toothed gear ring mounted in the wheel, an eccentric on the axle, a pinion mounted on the eccentric and meshing with said gear ring, and means for preventing the pinion from revolving on its own axis, means to hold the hub in predetermined position relative to the support for the stub-axle, and means to swing the stub-axle, the wheel-hub and the support therefor about said vertical pivots.

RICHARD B. HEWITT.